(12) United States Patent
Sago et al.

(10) Patent No.: US 11,577,692 B2
(45) Date of Patent: Feb. 14, 2023

(54) ENGINE STARTING DEVICE AND METHOD FOR MANUFACTURING THE SAME

(71) Applicant: Alps Alpine Co., Ltd., Tokyo (JP)

(72) Inventors: Tetsuya Sago, Miyagi-ken (JP); Yusuke Hosono, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/118,842

(22) Filed: Dec. 11, 2020

(65) Prior Publication Data

US 2021/0129796 A1    May 6, 2021

Related U.S. Application Data

(63) Continuation of application No. PCT/JP2019/009168, filed on Mar. 7, 2019.

(30) Foreign Application Priority Data

Jun. 26, 2018 (JP) .............................. JP2018-120541

(51) Int. Cl.
*H01Q 1/22* (2006.01)
*B60R 25/24* (2013.01)
*H01Q 1/32* (2006.01)

(52) U.S. Cl.
CPC ......... *B60R 25/245* (2013.01); *H01Q 1/2216* (2013.01); *H01Q 1/3233* (2013.01); *H01Q 1/3291* (2013.01)

(58) Field of Classification Search
CPC ... B60R 25/245; B60R 25/24; B60R 16/0235; H01Q 1/2216; H01Q 1/3233; H01Q 1/3291; H01Q 1/3241; H01Q 7/08; H01Q 7/00; H01Q 7/06; H01Q 1/38; H01Q 1/3275; H01Q 1/36; H01Q 13/16; H01Q 9/0421; H01Q 9/045; H01Q 1/22; H01Q 1/2283; H01Q 21/065; H01Q 23/00;
(Continued)

(56) References Cited

U.S. PATENT DOCUMENTS

| 4,157,207 A * | 6/1979 | Robinson ............. H01R 12/716 439/82 |
| 8,764,493 B2 * | 7/2014 | Renteria ................ H01R 12/70 439/676 |
| 2015/0170850 A1 * | 6/2015 | Kirita ..................... H01H 13/83 200/314 |
| 2015/0214606 A1 | 7/2015 | Sano et al. |

(Continued)

FOREIGN PATENT DOCUMENTS

| EP | 3182424 | 6/2017 |
| JP | 2012-116422 | 6/2012 |

(Continued)

OTHER PUBLICATIONS

Written Opinion and International Search Report from corresponding International Application No. PCT/JP2019/009168, 8 pgs., dated Jun. 4, 2019.

*Primary Examiner* — Andrea Lindgren Baltzell
(74) *Attorney, Agent, or Firm* — Crowell & Moring LLP

(57) ABSTRACT

An engine starting device includes a board on which a pin header serving as an on-board component is mounted, a case member that has a tubular shape and that is disposed so as to surround the board, and an antenna coil that is disposed in the case member and that is electrically connected to an antenna terminal partly embedded in the pin header serving as an on-board component.

9 Claims, 6 Drawing Sheets

(58) Field of Classification Search
CPC .. H01Q 9/42; H01H 13/023; H01H 2219/062; H01H 9/02; H01H 13/52; H01H 2219/036; H01H 2231/026; H01H 13/14; H01H 9/168; H01H 13/04; H01H 13/50; H01H 13/83; H01H 2219/0622; H01H 2219/066; H01H 2221/062; H01H 2239/024; H01H 2300/032; H01H 27/00; H01H 3/12; B60K 20/02; B60K 37/06; B60K 35/00; B60K 20/00; B60K 20/08; B60K 2370/126; B60K 2370/128; B60K 2370/131; B60K 2370/152; B60K 2370/158; B60K 2370/162; B60K 2370/341; B60K 26/021; B60K 37/02; B60K 2370/1446; B60K 2370/782

See application file for complete search history.

(56) References Cited

U.S. PATENT DOCUMENTS

| | | |
|---|---|---|
| 2015/0233335 A1 | 8/2015 | Lim |
| 2016/0155591 A1 | 6/2016 | Miura et al. |
| 2017/0018377 A1 | 1/2017 | Okuda et al. |

FOREIGN PATENT DOCUMENTS

| | | |
|---|---|---|
| JP | 2014-167260 | 9/2014 |
| JP | 2015-142279 | 8/2015 |
| JP | 2015-187968 | 10/2015 |
| JP | 2015-529390 | 10/2015 |
| JP | 2016-103606 | 6/2016 |
| WO | WO 2014/017325 | 1/2014 |

\* cited by examiner

FIG. 3A
FIG. 3B
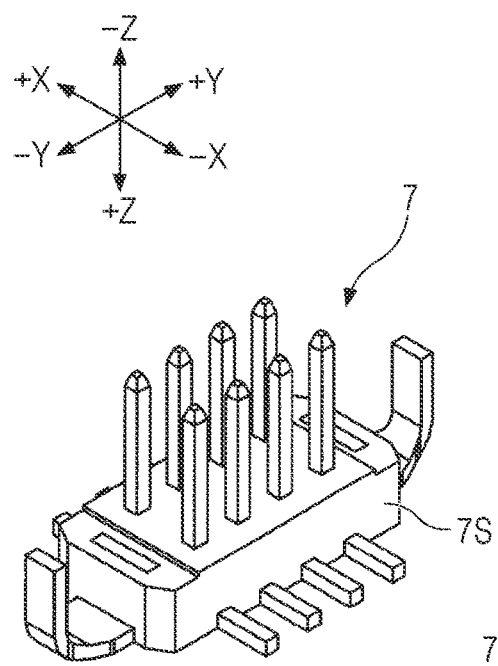
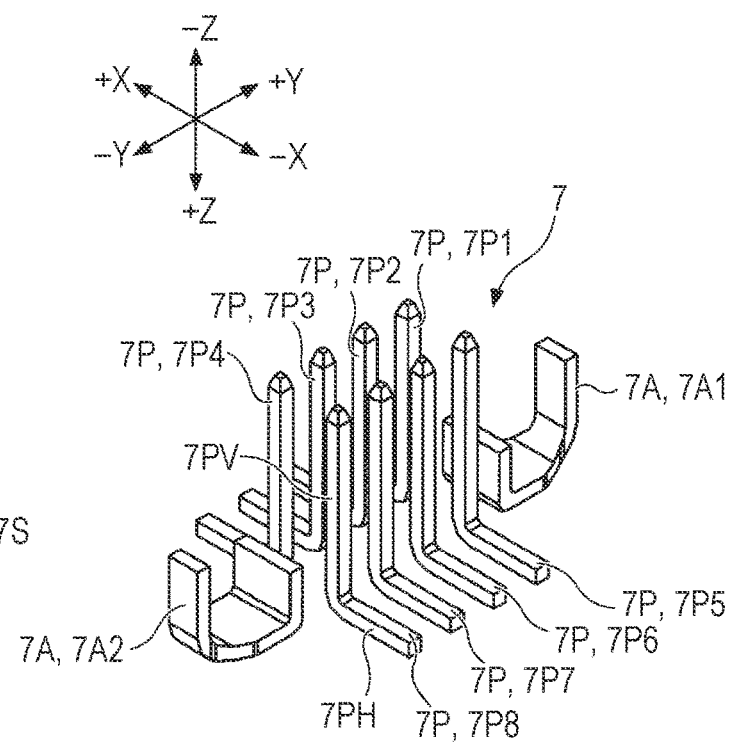

ENGINE STARTING DEVICE AND METHOD FOR MANUFACTURING THE SAME

CLAIM OF PRIORITY

This application is a Continuation of International Application No. PCT/JP2019/009168 filed on Mar. 7, 2019, which claims benefit of priority to Japanese Patent Application No. 2018-120541 filed on Jun. 26, 2018. The entire contents of each application noted above are hereby incorporated by reference.

BACKGROUND

1. Field of the Disclosure

The present disclosure relates to an engine starting device and a method for manufacturing an engine starting device. The engine starting device is usable for starting an engine mounted in a vehicle.

2. Description of the Related Art

A push start switch that is usable in an engine starting system is known in the art (see, for example, Japanese Unexamined Patent Application Publication No. 2015-187968). The engine starting system causes an engine to start when the push start switch is pushed in a situation in which a portable device (portable key) including a transponder coil exists around the engine starting system. Specifically, when a knob slidably supported by a body is pushed, a rubber contact inside the knob is compressed, and a movable contact formed on the inside of the rubber contact comes into contact with a fixed contact formed on the surface of a board to start the engine. The engine starting system includes an antenna coil, around the body, for performing wireless communication with the portable key. The antenna coil is connected to a connector on the inside of the board via coil terminals embedded in the body.

However, the coil terminals are embedded in the body by insert molding, and thus the push start switch has a complex structure, which may cause an increase in manufacturing cost.

SUMMARY

An engine starting device includes a board on which an on-board component is mounted. The on-board component may be a pin header or a pin socket. A case member has a tubular shape and is disposed so as to surround the board. An antenna coil is disposed in the case member and is electrically connected to an antenna terminal partly embedded in the on-board component.

BRIEF DESCRIPTION OF THE DRAWINGS

FIGS. 3A and 3B illustrate an example of a configuration of a pin header;

DESCRIPTION OF THE EXEMPLARY EMBODIMENTS

Figure 1:
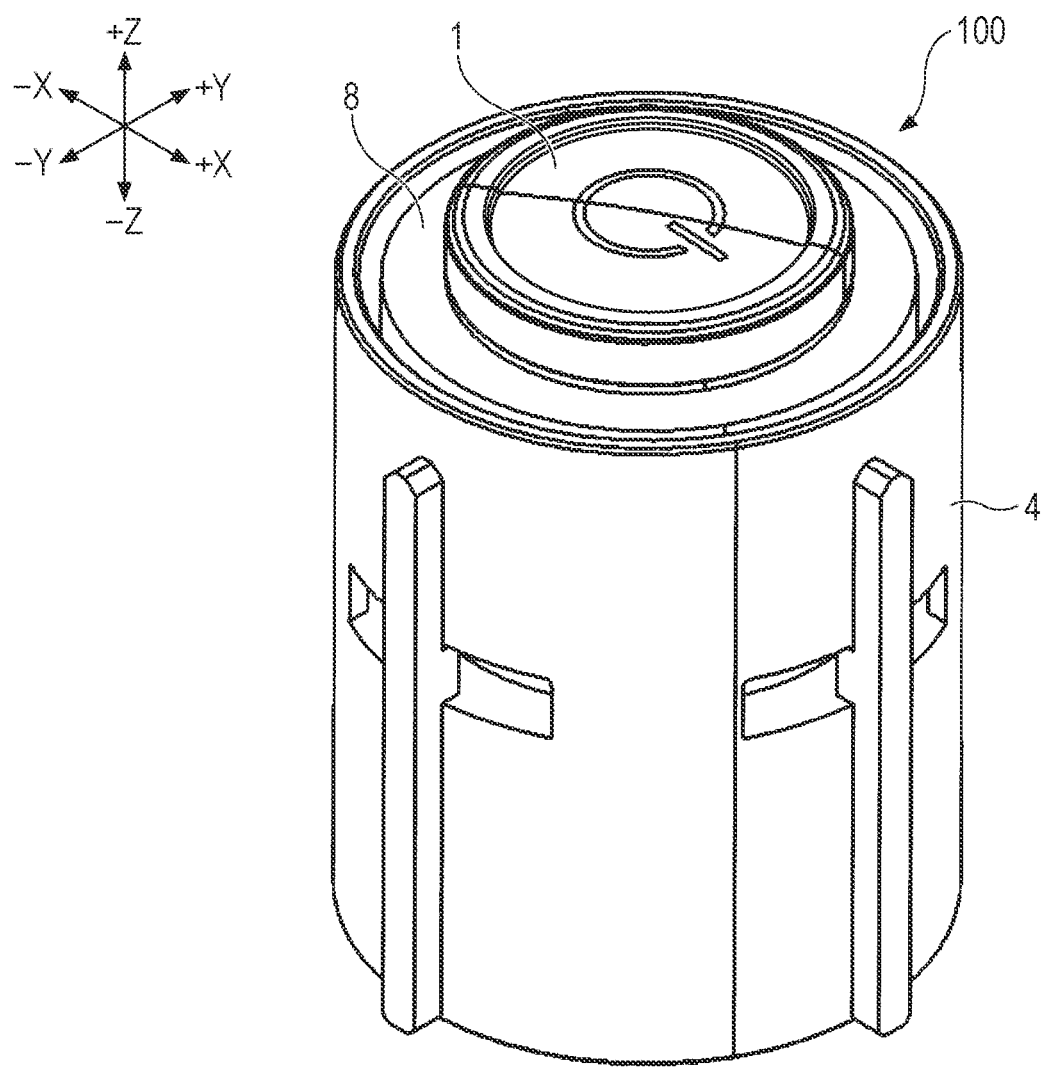
FIG. 1 is a perspective view of an example of a configuration of an engine starting device.
Figure 2:
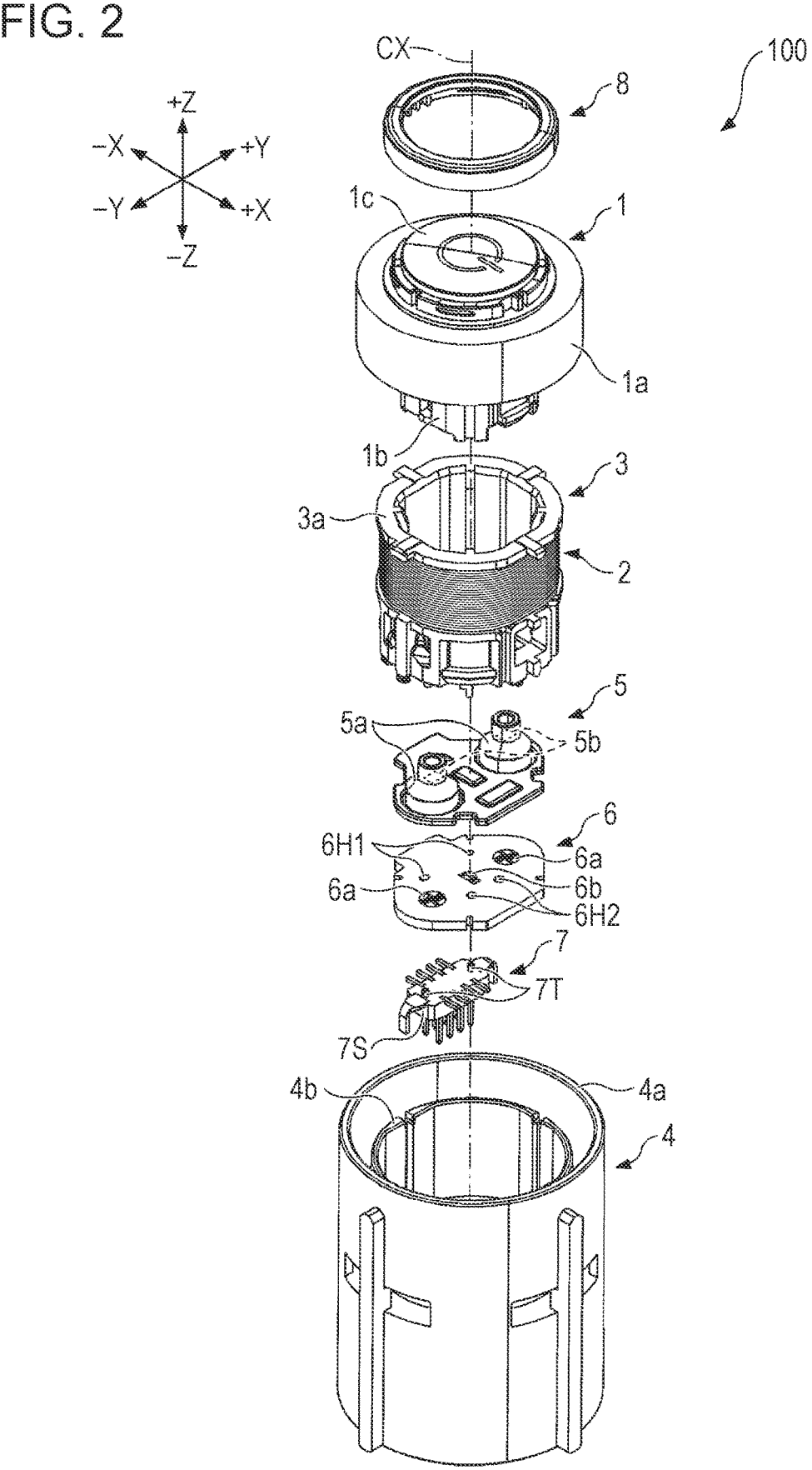
FIG. 2 is an exploded perspective view of the engine starting device in FIG. 1.

An engine starting device 100 according to an embodiment of the present invention is described below with reference to the drawings. FIG. 1 is a perspective view illustrating an example of a configuration of the engine starting device 100. FIG. 2 is an exploded perspective view of the engine starting device 100. A dot-dashed line in FIG. 2 indicates a central axis CX of the engine starting device 100.

The engine starting device 100 is an in-vehicle device for starting a vehicle engine and is attached at a position where an operator seated in the driver's seat can operate the engine starting device 100. In the present embodiment, the engine starting device 100 is a push engine start switch having a built-in immobilizer antenna. The engine starting device 100 is a push switch device that may have a cylindrical shape. The engine starting device 100 is may comprise an operating member 1, an antenna coil 2, a bobbin member 3, a case member 4, an elastic member 5, a board 6, a pin header 7, and a ring 8. However, the engine starting device 100 may also be a square tubular device.

The operating member 1 is disposed forward (on the +Z side) of the board 6. In the present embodiment, the operating member 1 is made from a synthetic resin. As illustrated in FIG. 2, the operating member 1 has a double tubular structure extending in the front-back direction (Z-axis direction) and includes an outer tubular portion 1a and an inner tubular portion 1b. The front surface (surface closer to the +Z side) of the operating member 1 forms an operating surface 1c, which receives a pressing force applied by an operator. The operating surface 1c has light transparency, and a standby symbol is affixed to the operating surface 1c.

The bobbin member 3 is disposed forward of the board 6. In the present embodiment, the bobbin member 3 is made from a synthetic resin. As illustrated in FIG. 2, the bobbin member 3 includes a tubular portion 3a having a tubular structure extending in the front-back direction. The inner tubular portion 1b of the operating member 1 is formed so as to be fitted into the tubular portion 3a and is housed inside the tubular portion 3a.

The antenna coil 2 is disposed forward of the board 6. In the present embodiment, the antenna coil 2 is wound around the tubular portion 3a of the bobbin member 3.

The case member 4 is disposed so as to surround the board 6. In the present embodiment, the case member 4 is made from a synthetic resin. As illustrated in FIG. 2, a front part of the case member 4 has a double tubular structure extending in the front-back direction and includes an outer tubular portion 4a and an inner tubular portion 4b. The tubular portion 3a of the bobbin member 3 is formed so as to be fitted into the inner tubular portion 4b. Thus, the antenna coil 2 is housed between the tubular portion 3a of the bobbin member 3 and the inner tubular portion 4b. The outer tubular portion 1a of the operating member 1 is housed so as to be slidable, in the front-back direction, between the outer tubular portion 4a and the inner tubular portion 4b. A rear part of the case member 4 is formed such that a connector is connectable thereto.

The elastic member 5 is a sheet-like member made of an elastic material such as rubber and is disposed forward of the board 6. In the present embodiment, the elastic member 5 is a rubber contact made of a rubber having light transparency.

As illustrated in FIG. 2, the elastic member 5 is attached so as to cover the front surface of the board 6. The elastic member 5 includes domed portions 5a, which are each formed such that the front surface thereof is convex and the rear surface thereof is concave. The domed portions 5a deform elastically rearward when pushed from the front. Movable contacts 5b are formed on the respective rear surfaces of the domed portions 5a.

The board 6 is a plate-like member to be housed in the case member 4. Fixed contacts 6a are formed on the front surface of the board 6. The fixed contacts 6a are counterparts to the movable contacts 5b formed on the respective rear surfaces of the domed portions 5a of the elastic member 5. When the operating member 1 is pushed and the inner tubular portion 1b slides rearward, the domed portions 5a of the elastic member 5 are pressed rearward by a rear end portion of the inner tubular portion 1b. Thus, the domed portions 5a are elastically deformed and flattened. As a result, the movable contacts 5b formed on the respective rear surfaces of the domed portions 5a come into contact with the respective fixed contacts 6a formed on the front surface of the board 6. When the movable contacts 5b and the fixed contacts 6a come into contact with each other in a situation in which a portable key exists around the engine starting device 100, for example, the engine starting device 100 switches the engine between an on state and an off state.

A light-emitting device 6b, such as an LED, is mounted in a center portion of the front surface of the board 6. The light-emitting device 6b performs a function of illuminating the operating surface 1c of the operating member 1 from behind. A plurality of electronic components are mounted in the rear surface of the board 6 and form an electronic circuit. In addition, the pin header 7 having an external connection terminal extending rearward is attached to the rear surface of the board 6.

The pin header 7 is an on-board component to be mounted on the rear (−Z side) of the board 6. In the present embodiment, the pin header 7 is a component in which metal components are embedded in a housing 7S made from a synthetic resin and is soldered to the board 6 by reflow soldering. The pin header 7 may be a pin socket.

The positioning of the pin header 7 is performed by fitting two projections 7T, which are formed on the front surface (surface closer to the +Z side) of the housing 7S, into two respective through holes 6H1, which are formed in the board 6. The positioning of the elastic member 5 is performed by fitting two projections 5P (not illustrated in FIG. 2; see FIG. 5), which are formed on the rear surface (surface closer to the −Z side) of the elastic member 5, into two respective through holes 6H2, which are formed in the board 6.

The ring 8 is a member disposed forward (on the +Z side) of the operating member 1. In the present embodiment, the ring 8 is an annular ornamental member made from a synthetic resin and is attached so as to surround the operating surface 1c of the operating member 1.

The rear part of the case member 4 is disposed rearward (on the −Z side) of the board 6 in a state in which the board 6 is housed in the case member 4. In the present embodiment, the rear part of the case member 4 has a connector portion that is a counterpart to the pin header 7 attached to the rear surface of the board 6. The connector portion provides a recess into which an external connector is inserted.

With the above configuration, the engine starting device 100 causes an engine to start when the operating member 1 is pushed, for example, in a situation in which a portable key including a transponder coil exists around the engine starting device 100, that is, in a situation in which the engine starting device 100 receives a radio signal transmitted by the portable key. Specifically, when the operating member 1 is pushed, the elastic member 5 inside the bobbin member 3 is compressed, and the movable contacts 5b formed on the respective rear surfaces of the domed portions 5a of the elastic member 5 come into contact with the respective fixed contacts 6a formed on the front surface of the board 6 to start the engine.

Even if the portable key cannot transmit radio signals due to a battery mounted in the portable key being drained, the portable key can transmit a radio signal to the engine starting device 100 when the portable key is close to the engine starting device 100. This is because the engine starting device 100 can emit transponder-driving radio waves forward via the antenna coil 2. Specifically, the board 6 is connected to an external circuit (not illustrated) via the connector portion formed at the rear part of the case member 4. In addition, the board 6 is configured to generate electrical signals resulting in transponder-driving radio waves, for example, when the operating member 1 is pushed. The board 6 may be configured to generate electrical signals repeatedly in a predetermined control cycle. The antenna coil 2 is configured to emit the electrical signals generated by the board 6 as transponder-driving radio waves. The portable key can generate an electromotive force for driving a transponder (transmitter circuit) by using transponder-driving radio waves. This configuration enables an operator to start an engine by only pushing the operating surface 1c of the operating member 1 while holding, close to the engine starting device 100, the portable key whose battery is drained.

Figure 4A:
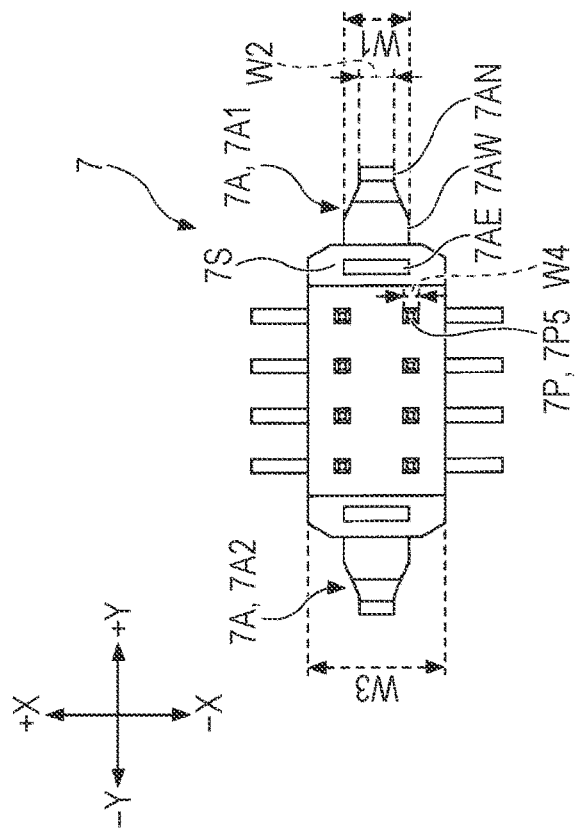
FIGS. 4A to 4D illustrate an example of the configuration of the pin header.
Figure 4C:
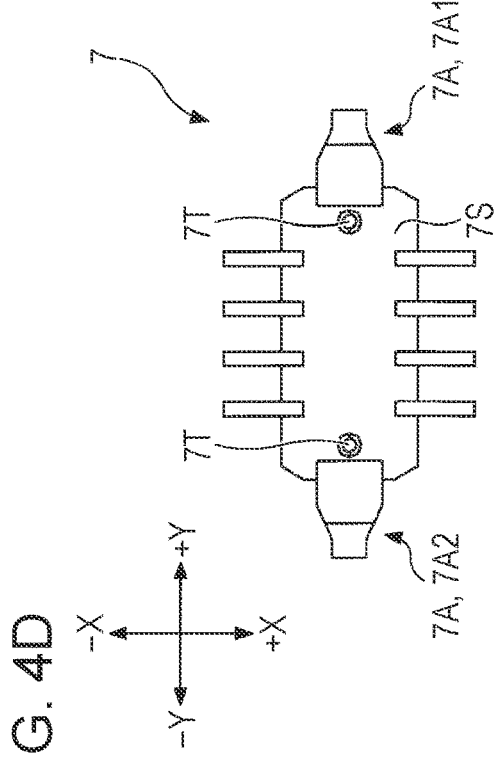
Figure 4B:
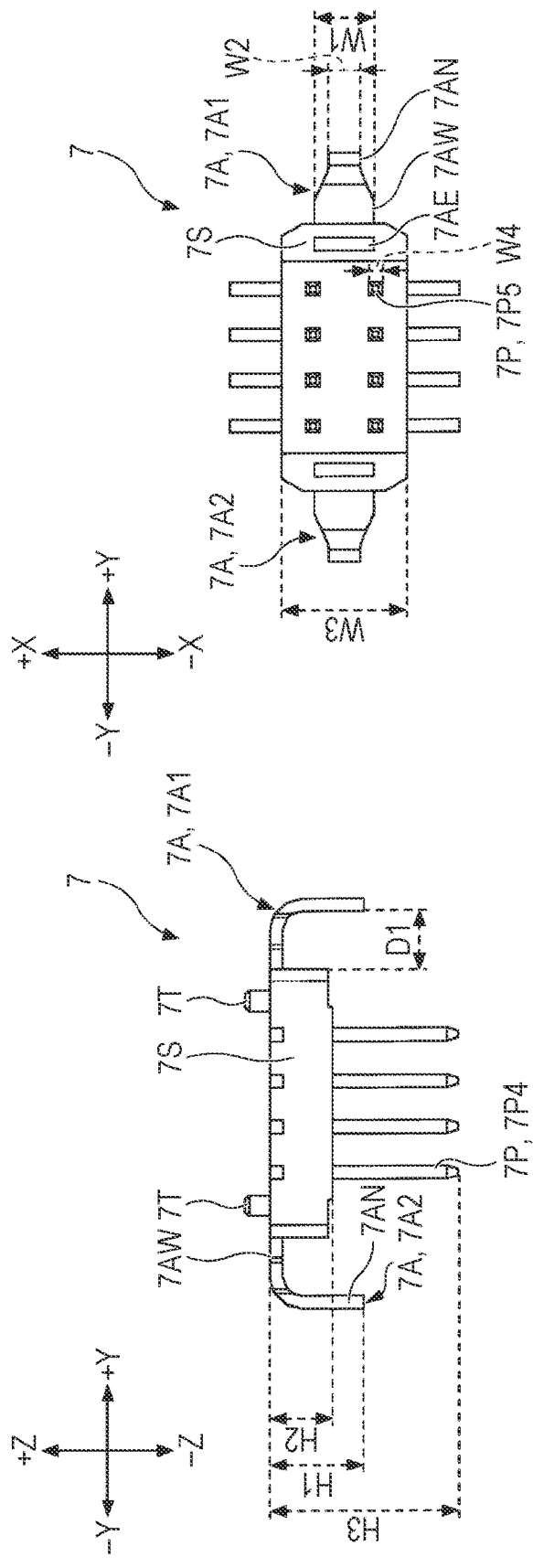
Figure 4D:
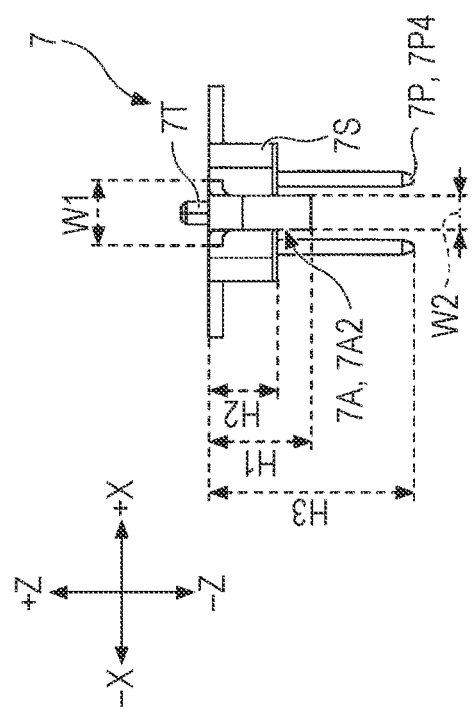

Next, examples of the configuration of the pin header 7 are described with reference to FIGS. 3A to 4D. FIGS. 3A and 3B illustrate an example of the configuration of the pin header 7 attached to the rear surface (surface closer to the −Z side) of the board 6. Specifically, FIG. 3A is a perspective view of the pin header 7. FIG. 3B is a perspective view of metal members embedded in the pin header 7. FIG. 3B corresponds to the diagram in FIG. 3A except with the housing 7S not illustrated. FIGS. 4A to 4D also illustrate an example of the configuration of the pin header 7. Specifically, FIG. 4A is a right side view of the pin header 7. FIG. 4B is a front view of the pin header 7. FIG. 4C is a bottom view of the pin header 7. FIG. 4D is a top view of the pin header 7. FIGS. 3A to 4D do not illustrate the board 6 to clarify the figures.

In the present embodiment, the pin header 7 includes an antenna terminal 7A and a pin member 7P. The antenna terminal 7A and the pin member 7P are embedded in the housing 7S by insert molding.

The pin member 7P is connected to external electronic equipment via a connector. In the present embodiment, the pin member 7P includes eight pin members 7P1 to 7P8, each of which has an L shape. As illustrated in FIG. 3B, the pin member 7P8 includes a parallel part 7PH, which extends in a direction (X-axis direction) parallel to the rear surface (surface closer to the −Z side) of the board 6, and a perpendicular part 7PV, which extends in a direction (Z-axis direction) perpendicular to the rear surface (surface closer to the −Z side) of the board 6. The pin members 7P1 to 7P7 have a similar configuration.

The pin members 7P1 to 7P4 are disposed such that each parallel part 7PH thereof extends toward the +X side. The pin members 7P5 to 7P8 are disposed such that each parallel part 7PH thereof extends toward the −X side.

The antenna terminal 7A is a terminal to which an end portion of a wire forming the antenna coil 2 is electrically connected. The antenna terminal 7A includes a first antenna terminal 7A1 and a second antenna terminal 7A2. In the present embodiment, one end of the antenna coil 2 is wound around and welded, by laser welding, to the first antenna terminal 7A1. The other end of the antenna coil 2 is wound around and welded, by laser welding, to the second antenna terminal 7A2. However, the end portions of the antenna coil 2 and the antenna terminals may be connected by another welding method such as resistance welding, fusion welding, or ultrasonic welding. When the antenna terminal 7A is connected by fusion welding, the antenna terminal 7A may be formed so as to include a folded portion. The end portions of the antenna coil 2 and the antenna terminals may be connected with an electrically conductive adhesive or by soldering.

In the present embodiment, the first antenna terminal 7A1 and the second antenna terminal 7A2 have the same shape. However, the first antenna terminal 7A1 and the second antenna terminal 7A2 may have different shapes.

As illustrated in FIGS. 4A and 4C, the antenna terminal 7A includes a wide portion 7AW, which extends along the board 6, a narrow portion 7AN, which extends in a direction away from the board 6, and an embedded portion 7AE, which is embedded in the housing 7S. Specifically, the wide portion 7AW extends along the rear surface (surface closer to the −Z side) of the board 6. The narrow portion 7AN extends in a direction perpendicular to the rear surface of the board 6. The embedded portion 7AE extends in the direction perpendicular to the rear surface of the board 6. However, the narrow portion 7AN may be formed so as to extend obliquely relative to the rear surface of the board 6. In this case, the narrow portion 7AN may be formed so as to extend in a direction away from the housing 7S. The narrow portion 7AN may have a retaining portion that prevents the end portion of the antenna coil 2 wound around the narrow portion 7AN from slipping out of the narrow portion 7AN. The combination of the embedded portion 7AE and the wide portion 7AW also functions as a part for more firmly fixing the pin header 7 to the board 6.

The wide portion 7AW and the narrow portion 7AN typically have a rectangular section. This is because the antenna terminal 7A is formed by working a metal plate through sheet metal processing such as blanking and bending. However, the wide portion 7AW and the narrow portion 7AN may have another sectional shape such as a round shape or an oval shape.

As illustrated in FIG. 4C, a width W1 of the wide portion 7AW is larger than a width W2 of the narrow portion 7AN and is smaller than a width W3 of the housing 7S. The width W2 of the narrow portion 7AN is larger than a width W4 of the pin member 7P.

The length of the narrow portion 7AN, that is, a distance H1 between the board 6 and the tip of the narrow portion 7AN, is set, for example, such that three to five turns of the end portion of the antenna coil 2 can be wound around the narrow portion 7AN. In the present embodiment, as illustrated in FIGS. 4A and 4B, the distance H1 is larger than a distance H2 between the board 6 and the rear surface (surface closer to the −Z side) of the housing 7S and is smaller than a distance H3 between the board 6 and the tip of the pin member 7P.

A distance D1 between the narrow portion 7AN and the housing 7S is set, for example, so as to be sufficiently large to wind, with an automatic winding machine, the end portion of the antenna coil 2 around the narrow portion 7AN.

Figure 5:
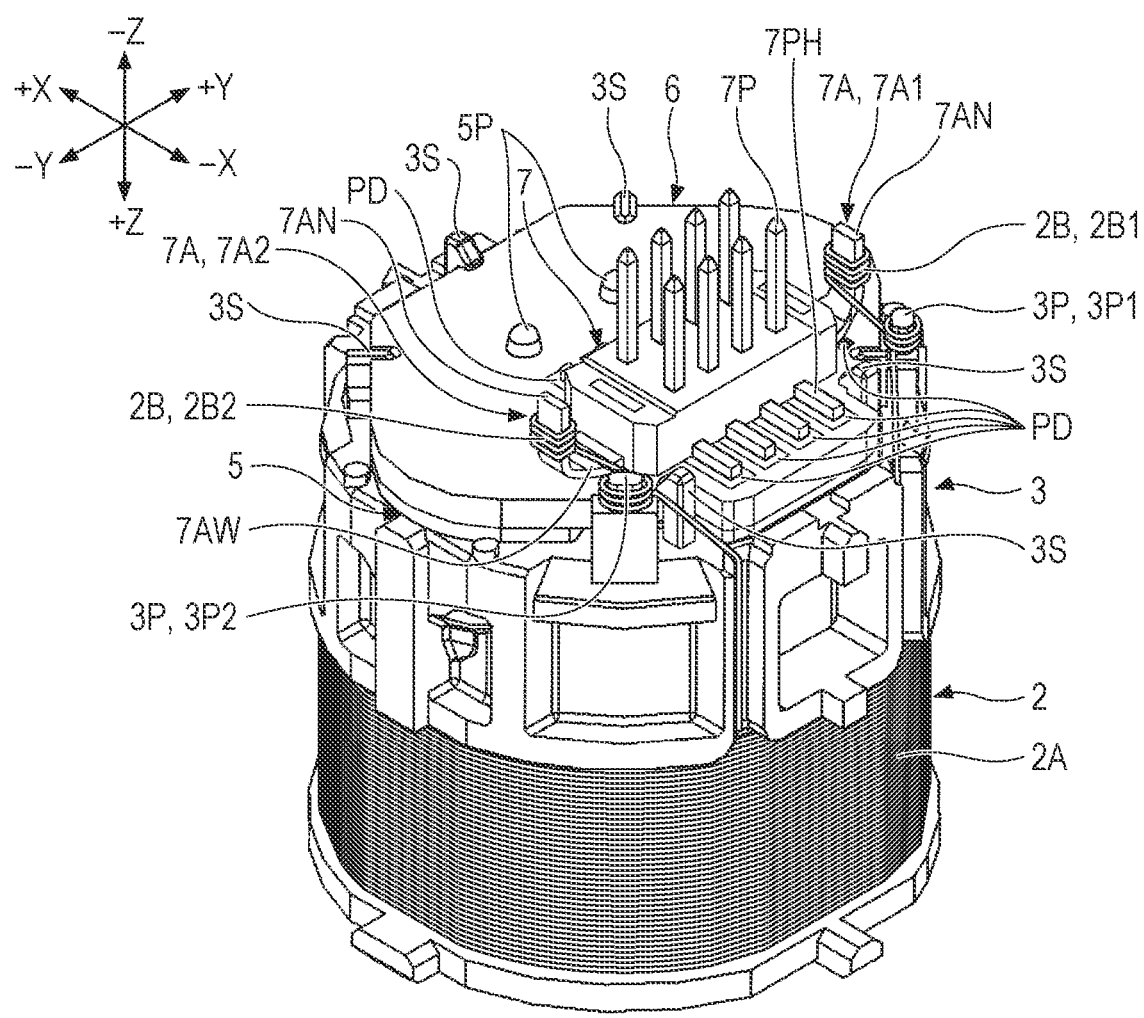
FIG. 5 is a perspective view of a bobbin member to which a board is attached and around which an antenna coil is wound.
Figure 6A:
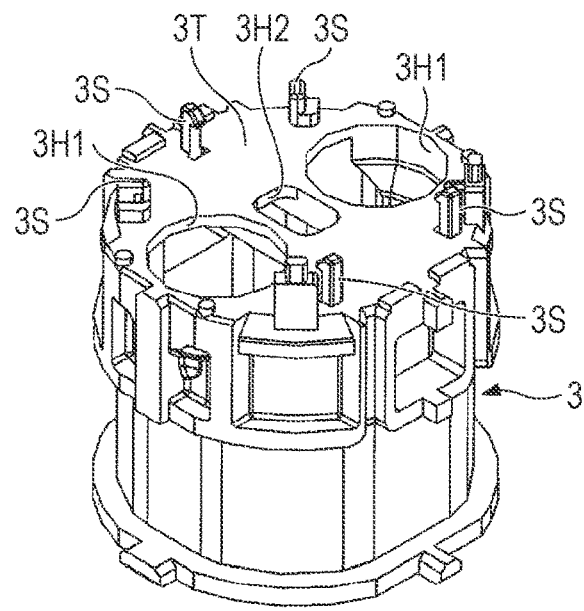
FIGS. 6A to 6C illustrate a method for connecting the antenna coil to an antenna terminal.
Figure 6B:
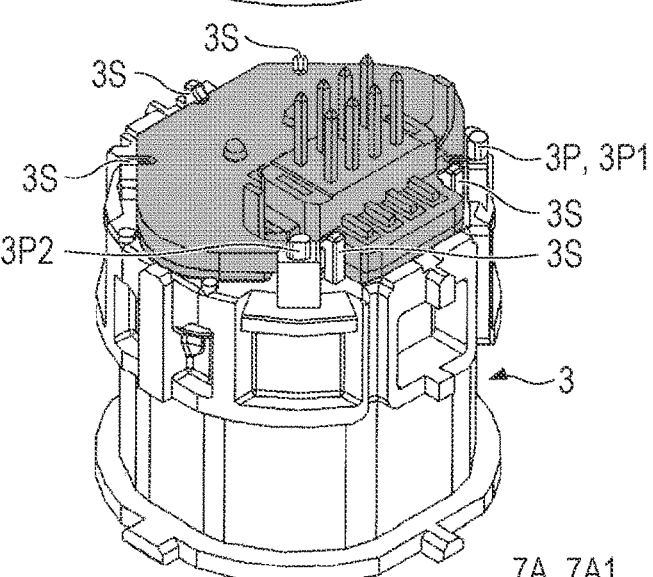
Figure 6C:
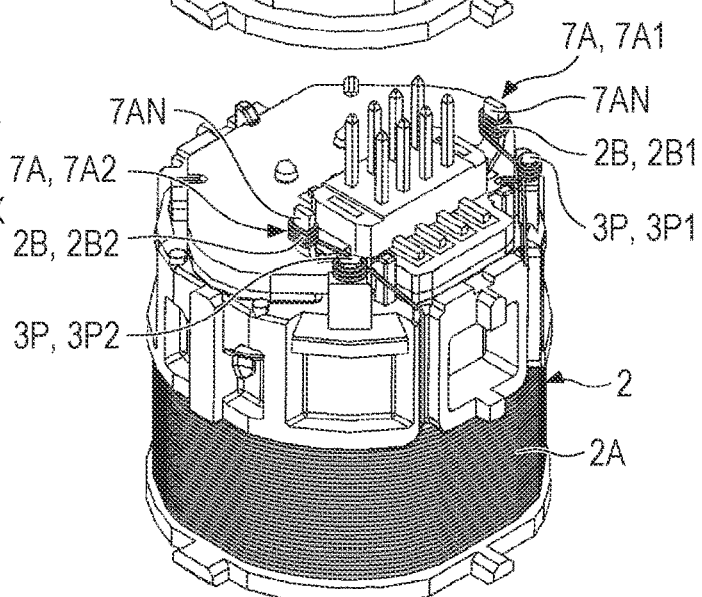

Next, the relationship between the antenna coil 2 and the antenna terminal 7A is described with reference to FIGS. 5 to 6C. FIG. 5 is a perspective view of the bobbin member 3 to which the board 6 is attached and around which the antenna coil 2 is wound. FIGS. 6A to 6C illustrate a method for electrically connecting the end portions of the antenna coil 2 to the antenna terminal 7A. FIG. 6A is a perspective view of the bobbin member 3 to which the board 6 is yet to be attached. FIG. 6B is a perspective view of the bobbin member 3 to which the board 6 is attached. FIG. 6C is a perspective view of the bobbin member 3 to which the board 6 is attached and around which the antenna coil 2 is thereafter wound. Dot-patterned members in FIGS. 6B and 6C are newly added members.

As illustrated in FIGS. 6A and 6B, the board 6 is attached to an end face 3T, which is on the rear (−Z side) of the bobbin member 3, in a state in which the elastic member 5 is attached to the front surface (surface closer to the +Z side) of the board 6 and in which the pin header 7 is attached to the rear surface (surface closer to the −Z side) of the board 6. Specifically, the board 6 is retained by the bobbin member 3 in a state in which the board 6 is held, from behind (the −Z side), by five holding portions 3S, which are formed on the rear end portion of the bobbin member 3. As illustrated in FIG. 6A, two holes 3H1, which receive the two respective domed portions 5a of the elastic member 5, and a hole 3H2, through which the light emitted from the light-emitting device 6b attached to the front surface of the board 6 passes, are formed in the end face 3T.

As illustrated in FIG. 5, in the pin header 7, the wide portion 7AW of the antenna terminal 7A and the parallel part 7PH of the pin member 7P are configured to be electrically and mechanically connected, by reflow soldering, to a pad PD, which is a land formed on the rear surface of the board 6.

As illustrated in FIG. 5, the antenna coil 2 includes a winding portion 2A, which is wound around the bobbin member 3, and an extending portion 2B, which extends between the winding portion 2A and the antenna terminal 7A. The extending portion 2B includes a first extending portion 2B1, which extends between the winding portion 2A and the first antenna terminal 7A1, and a second extending portion 2B2, which extends between the winding portion 2A and the second antenna terminal 7A2.

In the present embodiment, two turns of the extending portion 2B are wound around a projection 3P, which is formed on the rear end portion of the bobbin member 3, and three turns of the extending portion 2B are wound around the antenna terminal 7A. Specifically, as illustrated in FIG. 5, two turns of the first extending portion 2B1 are wound around a projection 3P1, which is formed on the rear end portion of the bobbin member 3, and three turns of the first extending portion 2B1 are wound around the narrow portion 7AN of the first antenna terminal 7A1. Two turns of the second extending portion 2B2 are wound around a projection 3P2, which is formed on the rear end portion of the bobbin member 3, and three turns of the second extending portion 2B2 are wound around the narrow portion 7AN of the second antenna terminal 7A2.

As described above, the extending portion 2B is wound around the projection 3P of the bobbin member 3 between the winding portion 2A and the antenna terminal 7A. This configuration provides the effect of being capable of absorbing the difference between the thermal expansion coefficient of the antenna coil 2 and the thermal expansion coefficient of the bobbin member 3. For example, this configuration provides the effect of being capable of preventing the extending portion 2B from breaking when the bobbin member 3 expands. However, the extending portion 2B may be configured to be wound around only the antenna terminal 7A without being wound around the projection 3P.

In the present embodiment, the antenna coil 2 is wound by an automatic winding machine. Specifically, the first extending portion 2B1 is first wound around the narrow portion 7AN of the first antenna terminal 7A1 and then wound around the projection 3P1 of the bobbin member 3. Subsequently, the wire is wound around the bobbin member 3 to form the winding portion 2A. Subsequently, the second extending portion 2B2 is wound around the projection 3P2 of the bobbin member 3 and then wound around the narrow portion 7AN of the second antenna terminal 7A2. However, the antenna coil 2 may be wound in a different order by an automatic winding machine or may be wound manually. The extending portion 2B wound around the antenna terminal 7A is fixed to the antenna terminal 7A by laser welding.

In the present embodiment, the pin header 7 is disposed close to the end portion closer to the −X side of the board 6. That is, the pin header 7 is disposed on the rear surface of the board 6 such that the distance between the projection 3P of the bobbin member 3 and the antenna terminal 7A is as small as possible. In addition, the pin header 7 is disposed such that the distance between the projection 3P1 and the first antenna terminal 7A1 is substantially equal to the distance between the projection 3P2 and the second antenna terminal 7A2. In other words, the projections 3P1 and 3P2 of the bobbin member 3 are disposed on the rear end portion of the bobbin member 3 such that the distance between the projection 3P1 and the first antenna terminal 7A1 is substantially equal to the distance between the projection 3P2 and the second antenna terminal 7A2. This is to reduce or prevent breakage of the extending portion 2B. However, the pin header 7 may be disposed on a center portion of the board 6 or may be disposed such that the distance between the projection 3P1 and the first antenna terminal 7A1 differs from the distance between the projection 3P2 and the second antenna terminal 7A2.

As described above, the engine starting device 100 according to the embodiment of the present invention includes the board 6, on which the pin header 7 serving as an on-board component is mounted, the case member 4, which has a tubular shape and is disposed so as to surround the board 6, and the antenna coil 2, which is disposed in the case member 4 and is electrically connected to the antenna terminal 7A partly embedded in the pin header 7.

This configuration of the engine starting device 100 enables the antenna coil 2 and the board 6 to be more readily electrically connected to each other. This is because the pin member 7P and the antenna terminal 7A embedded in the pin header 7 are connected by, for example, reflow soldering, to the pad PD on the board 6. That is, this is because a process of fixing the antenna terminal 7A to the bobbin member 3 or the board 6 and a process of separately electrically connecting the antenna terminal 7A to the board 6 (pad PD) by, for example, soldering are omitted. In addition, the engine starting device 100 has a simple structure in which the antenna terminal 7A is embedded in the pin header 7, and thus the manufacturing cost can be reduced. As a result, it is possible to provide the engine starting device 100 at a low cost.

Preferably, the antenna terminal 7A includes the first antenna terminal 7A1 and the second antenna terminal 7A2. In this case, one end of the antenna coil 2 is connected to the first antenna terminal 7A1, and the other end of the antenna coil 2 is connected to the second antenna terminal 7A2.

This configuration of the engine starting device 100 enables the antenna coil 2 and the board 6 to be even more readily electrically connected to each other. This is because both the first antenna terminal 7A1 and the second antenna terminal 7A2 are connected to the board 6 by, for example, reflow soldering.

The one end of the antenna coil 2 is preferably welded to the first antenna terminal 7A1 embedded, by insert molding, in the pin header 7 serving as an on-board component, and the other end of the antenna coil 2 is preferably welded to the second antenna terminal 7A2 embedded, by insert molding, in the pin header 7 serving as an on-board component. Welding is achieved by, for example, laser welding, resistance welding, fusion welding, or ultrasonic welding.

This configuration of the engine starting device 100 according to the embodiment of the present invention enables the antenna coil 2 and the board 6 to be even more readily electrically connected to each other. This is because the end portions of the antenna coil 2 are readily connected to the antenna terminal 7A by welding.

Preferably, the engine starting device 100 includes the bobbin member 3 disposed inside the case member 4. In this case, the antenna coil 2 is wound around the bobbin member 3.

This configuration of the engine starting device 100 enables the antenna coil 2 and the board 6 to be even more readily electrically connected to each other. As illustrated in FIGS. 5 to 6C, this is because an assembler can fit, into the case member 4, the bobbin member 3 to which the board 6 is attached and around which the antenna coil 2 is wound. That is, this is because an assembler can complete the electrical connection between the antenna coil 2 and the board 6 before fitting the bobbin member 3 into the case member 4.

Preferably, the antenna terminal 7A includes the wide portion 7AW, which extends along the board 6, and the narrow portion 7AN, which extends in the direction away from the board 6. In this case, the end portion of the antenna coil 2 is wound around the narrow portion 7AN.

This configuration of the engine starting device 100 enables the antenna coil 2 and the board 6 to be more securely electrically connected to each other. This is because the antenna terminal 7A and the board 6 (pad PD) can be in contact with each other via the wide portion 7AW, which forms, with the board 6 (pad PD), a relatively large contact area. In addition, this is because the end portion of the antenna coil 2 is wound around the antenna terminal 7A via the narrow portion 7AN, which has a relatively small sectional area.

A method for manufacturing the engine starting device 100 according to the embodiment of the present invention includes a step of attaching the board 6, on which the pin header 7 serving as an on-board component is mounted, to the bobbin member 3, a step of winding one end of the antenna coil 2 around the first antenna terminal 7A1 partly embedded in the pin header 7, a step of winding the antenna coil 2 around the bobbin member 3, a step of winding the other end of the antenna coil 2 around the second antenna terminal 7A2 partly embedded in the pin header 7, a step of electrically connecting the one end of the antenna coil 2 to the first antenna terminal 7A1, and a step of electrically connecting the other end of the antenna coil 2 to the second antenna terminal 7A2.

This manufacturing method enables an operator to more readily connect the antenna coil 2 and the board 6. This is because the process of fixing the antenna terminal 7A to the bobbin member 3 or the board 6 and the process of separately electrically connecting the antenna terminal 7A to the board 6 (pad PD) by, for example, soldering can be omitted.

A preferred embodiment of the present invention is described above in detail. However, the present invention is not limited to the above embodiment. The above embodiment can be variously modified and replaced without departing from the scope of the present invention. The features described with reference to the above embodiment may be combined as appropriate without technically contradicting each other.

For example, in the above embodiment, although the pin header 7 is used as an on-board component in which the antenna terminal 7A is embedded, a pin socket may be used as an on-board component in which the antenna terminal 7A is embedded.

In addition, in the above embodiment, although the first antenna terminal 7A1 and the second antenna terminal 7A2 are embedded in the same single pin header 7, each may be embedded in a different on-board component. Specifically, the on-board component in which the first antenna terminal 7A1 is embedded may differ from the on-board component in which the second antenna terminal 7A2 is embedded.

What is claimed is:

1. An engine starting device comprising:
    a board having a pad;
    an on-board component having a molded housing and pin member that is molded with the housing such that it is partially embedded in the molded housing, the pin member being one of a pin header or a pin socket that is configured to connect to an external electronic equipment via a connector, the on-board component mounted on the board such that the pin member connects to the pad;
    an antenna terminal that is molded with the housing such that it is partially embedded in the molded housing, the antenna terminal being connected with the pad, wherein the pad electrically connects the antenna terminal to the pin member wherein the antenna terminal includes a wide portion and a narrow portion, the wide portion extending along the board, the narrow portion extending in a direction away from the board;
    reflow solder electrically and mechanically connecting together the pin member, the wide portion of the antenna terminal and the board;
    a case member having a tubular shape, the case member being disposed so as to surround the board; and
    an antenna coil disposed in the case member, the antenna coil being electrically connected to the antenna terminal.

2. The engine starting device according to claim 1, wherein:
    the antenna terminal includes a first antenna terminal and a second antenna terminal, and
    one end of the antenna coil is connected to the first antenna terminal, and another end of the antenna coil is connected to the second antenna terminal.

3. The engine starting device according to claim 2, wherein the one end of the antenna coil is insert molded to weld to the first antenna terminal embedded in the on-board component, and the other end of the antenna coil is insert molded to welded to the second antenna terminal embedded in the on-board component.

4. The engine starting device according to claim 1, further comprising:
    a bobbin member disposed inside the case member, wherein
    the antenna coil is wound around the bobbin member.

5. The engine starting device according to claim 1, wherein:
    an end portion of the antenna coil is wound around the narrow portion.

6. A method for manufacturing an engine starting device, the method comprising:
    partially embedding a first antenna terminal and a second antenna terminal in a housing of an on-board component by molding the first antenna terminal and the second antenna terminal with the housing of an on-board component,
    partially embedding a pin member that is configured to connect to an external electronic equipment via a connector in the housing by molding the pin member with the housing, the pin member being one of a pin header or a pin socket;
    mounting the on-board component to a board having a pad, the on-board component being mounted such that the pin member is connected to the pad and the first antenna terminal and the second antenna terminal are connected to the pad, wherein the pad electrically connects the first antenna terminal and the second antenna terminal to the pin member;
    attaching the board to a bobbin member;
    winding one end of an antenna coil around the first antenna terminal;
    winding the antenna coil around the bobbin member;
    winding another end of the antenna coil around the second antenna terminal;
    electrically connecting the one end of the antenna coil to the first antenna terminal; and
    electrically connecting the other end of the antenna coil to the second antenna terminal.

7. The method according to claim 6, further comprising:
    disposing the bobbin member inside a case member; and winding the antenna coil around the bobbin member.

8. The method according to claim 6, wherein the antenna terminal includes a wide portion and a narrow portion, the wide portion extends along the board, the narrow portion extends in a direction away from the board, and further comprising:
    winding either the one end portion or the other end portion of the antenna coil around the narrow portion.

9. The method according to claim 6, comprising:
    welding the one end of the antenna coil to the first antenna terminal embedded in the on-board component by insert molding; and
    welding the other end of the antenna coil to the second antenna terminal embedded in the on-board component by insert molding.

* * * * *